United States Patent
Miwa (10) Patent No.: US 9,256,229 B2
(45) Date of Patent: Feb. 9, 2016

(54) AIR-CONDITIONING CONTROL SYSTEM AND PROGRAM

(75) Inventor: Kazuo Miwa, Tokyo (JP)

(73) Assignee: Technomirai Co., Ltd., Tokyo (JP)

( * ) Notice: Subject to any disclaimer, the term of this patent is extended or adjusted under 35 U.S.C. 154(b) by 503 days.

(21) Appl. No.: 13/823,571

(22) PCT Filed: Oct. 27, 2010

(86) PCT No.: PCT/JP2010/069100
§ 371 (c)(1),
(2), (4) Date: Mar. 14, 2013

(87) PCT Pub. No.: WO2012/056533
PCT Pub. Date: May 3, 2012

(65) Prior Publication Data
US 2013/0178988 A1    Jul. 11, 2013

(51) Int. Cl.
*G05B 13/00* (2006.01)
*G05B 15/00* (2006.01)
*G05D 23/00* (2006.01)
*G05D 9/00* (2006.01)
(Continued)

(52) U.S. Cl.
CPC .............. *G05D 23/19* (2013.01); *F24F 11/006* (2013.01); *F25D 29/00* (2013.01); *G06Q 50/00* (2013.01); *A47F 3/0482* (2013.01); *F24F 2011/0013* (2013.01); *F24F 2011/0016* (2013.01); *F24F 2011/0061* (2013.01)

(58) Field of Classification Search
CPC ......... G05B 13/024; F23N 1/00; F24F 3/065; F24F 13/10; F24F 3/044; H02J 3/14; G05D 23/00; G06Q 50/06

USPC ................. 700/47; 165/238; 62/126, 51, 130; 236/51, 1 B
See application file for complete search history.

(56) References Cited

U.S. PATENT DOCUMENTS

| | | | |
|---|---|---|---|
| 2005/0194455 A1* | 9/2005 | Alles | ................... 236/1 B |
| 2006/0191275 A1 | 8/2006 | Jung et al. | |

(Continued)

FOREIGN PATENT DOCUMENTS

| | | |
|---|---|---|
| CN | 1825014 A | 8/2006 |
| CN | 1825015 A | 8/2006 |

(Continued)

OTHER PUBLICATIONS

International Search Report, mailed Dec. 7, 2010.
(Continued)

*Primary Examiner* — Mohammad Ali
*Assistant Examiner* — Md Azad
(74) *Attorney, Agent, or Firm* — Michael Best & Friedrich LLP (57) ABSTRACT

According to a calculation 13 of a peak operating rate of an air conditioner 19 based on an actual quantity of electric power used, a calculation 14 of an hourly average operating rate according to the peak operating rate in consideration of an outside air temperature, a calculation 15 of an hourly average surplus rate according to (1−average operating rate), and a calculation 16 of a control rate having the upper limit of the average surplus rate as a predetermined value, energy-saving control 17 of the air conditioner 19 is performed by a quantity of the control rate. Thereby, providing an air-conditioning control system 100 for achieving appropriate energy saving with simplified calculations.

4 Claims, 7 Drawing Sheets

(51) Int. Cl.

| | | |
|---|---|---|
| G05D 3/12 | (2006.01) | |
| G05D 17/00 | (2006.01) | |
| G05D 11/00 | (2006.01) | |
| G05B 13/02 | (2006.01) | |
| G05B 21/00 | (2006.01) | |
| G05D 23/19 | (2006.01) | |
| F25B 49/00 | (2006.01) | |
| F25D 17/04 | (2006.01) | |
| F25D 29/00 | (2006.01) | |
| F24F 11/00 | (2006.01) | |
| G06Q 50/00 | (2012.01) | |
| A47F 3/04 | (2006.01) | |

(56) References Cited

U.S. PATENT DOCUMENTS

2006/0207269 A1   9/2006   Jung et al.
2008/0099570 A1*  5/2008   Krebs et al. ................ 236/46 R
2009/0125149 A1   5/2009   Miwa
2009/0159716 A1   6/2009   Kim
2011/0093121 A1*  4/2011   Wakuta et al. ................ 700/276

FOREIGN PATENT DOCUMENTS

| CN | 101464022 A | 6/2009 |
|---|---|---|
| EP | 1557616 A1 | 7/2005 |
| JP | 2004-271165 A | 9/2004 |
| JP | 2005-106444 A | 4/2005 |
| JP | 2008-109813 A | 5/2008 |
| JP | 2008-128526 A | 6/2008 |
| KR | 100286555 B1 | 1/2001 |
| WO | WO-2006/085406 A1 | 8/2006 |

OTHER PUBLICATIONS

Office Action issued in Chinese Application No. 201080067351.4, dated Apr. 29, 2015.

Extended Search Report issued in European Application No. 10858922.7, dated Jul. 18, 2014.

* cited by examiner

| HOURS | JANUARY | | | | | | FEBRUARY | | | | | | |
|---|---|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | A) CURRENT OUTSIDE AIR TEMPERATURE | B) TEMPERATURE DIFFERENCE FROM ROOM TEMPERATURE | C) OUTSIDE AIR TEMPERATURE COEFFICIENT | D) QUANTITY OF ELECTRIC POWER CONSUMPTION (KWH) | E) AVERAGE OPERATING RATE | F) AVERAGE SURPLUS RATE | G) CONTROL RATE |
| 9:00 | 5.3 | 16.7 | 0.70 | 0.634 | 0.366 | 0.37 | 4.9 | 17.1 | 0.72 | | 0.649 | 0.35 | 0.35 |
| 10:00 | 7.8 | 14.2 | 0.60 | 0.539 | 0.461 | 0.40 | 6.8 | 15.2 | 0.64 | | 0.577 | 0.42 | 0.40 |
| 11:00 | 8.2 | 13.8 | 0.58 | 0.524 | 0.476 | 0.40 | 6.9 | 15.1 | 0.64 | | 0.573 | 0.43 | 0.40 |
| 12:00 | 8.4 | 13.6 | 0.57 | 0.516 | 0.484 | 0.40 | 7.9 | 14.1 | 0.59 | | 0.535 | 0.46 | 0.40 |
| 13:00 | 8.3 | 13.7 | 0.58 | 0.520 | 0.480 | 0.40 | 8.3 | 13.7 | 0.58 | | 0.520 | 0.48 | 0.40 |
| 14:00 | 7.8 | 14.2 | 0.60 | 0.539 | 0.461 | 0.40 | 8.6 | 13.4 | 0.57 | | 0.509 | 0.49 | 0.40 |
| 15:00 | 7.1 | 14.9 | 0.63 | 0.566 | 0.434 | 0.40 | 8.9 | 13.1 | 0.55 | | 0.497 | 0.50 | 0.40 |
| 16:00 | 6.2 | 15.8 | 0.67 | 0.600 | 0.400 | 0.40 | 8.4 | 13.6 | 0.57 | | 0.516 | 0.48 | 0.40 |
| 17:00 | 4.8 | 17.2 | 0.73 | 0.653 | 0.347 | 0.35 | 7.3 | 14.7 | 0.62 | | 0.558 | 0.44 | 0.40 |
| 18:00 | 3.7 | 18.3 | 0.77 | 0.695 | 0.305 | 0.31 | 5.7 | 16.3 | 0.69 | | 0.619 | 0.38 | 0.38 |
| 19:00 | 3.0 | 19.0 | 0.80 | 0.722 | 0.278 | 0.28 | 4.4 | 17.6 | 0.74 | | 0.668 | 0.33 | 0.33 |
| 20:00 | 2.6 | 19.4 | 0.82 | 0.737 | 0.263 | 0.26 | 4.5 | 17.5 | 0.74 | | 0.665 | 0.34 | 0.34 |
| 21:00 | 2.3 | 19.7 | 0.83 | 0.748 | 0.252 | 0.25 | 4.7 | 17.3 | 0.73 | | 0.657 | 0.34 | 0.34 |
| 22:00 | 1.8 | 20.2 | 0.85 | 0.767 | 0.233 | 0.23 | 3.7 | 18.3 | 0.77 | | 0.695 | 0.31 | 0.31 |
| 23:00 | 1.7 | 20.3 | 0.86 | 0.771 | 0.229 | 0.23 | 3.1 | 18.9 | 0.80 | | 0.718 | 0.28 | 0.28 |
| 0:00 | 1.6 | 20.4 | 0.86 | 0.775 | 0.225 | 0.23 | 2.3 | 19.7 | 0.83 | | 0.748 | 0.25 | 0.25 |
| 1:00 | 3.7 | 18.3 | 0.77 | 0.695 | 0.305 | 0.31 | 1.0 | 21.0 | 0.89 | | 0.797 | 0.20 | 0.20 |
| 2:00 | 3.1 | 18.9 | 0.80 | 0.718 | 0.282 | 0.28 | 0.1 | 21.9 | 0.92 | | 0.832 | 0.17 | 0.17 |
| 3:00 | 3.3 | 18.7 | 0.79 | 0.710 | 0.290 | 0.29 | -0.8 | 22.8 | 0.96 | | 0.866 | 0.13 | 0.13 |
| 4:00 | 3.1 | 18.9 | 0.80 | 0.718 | 0.282 | 0.28 | -1.1 | 23.1 | 0.97 | | 0.877 | 0.12 | 0.12 |
| 5:00 | 2.9 | 19.1 | 0.81 | 0.725 | 0.275 | 0.27 | 0.4 | 21.6 | 0.91 | | 0.820 | 0.18 | 0.18 |
| 6:00 | 3.0 | 19.0 | 0.80 | 0.722 | 0.278 | 0.28 | -1.7 | 23.7 | 1.00 | 13.5 | 0.900 | 0.10 | 0.10 |
| 7:00 | 3.3 | 18.7 | 0.79 | 0.710 | 0.290 | 0.29 | -0.8 | 22.8 | 0.96 | | 0.866 | 0.13 | 0.13 |
| 8:00 | 3.7 | 18.3 | 0.77 | 0.695 | 0.305 | 0.31 | 2.8 | 19.2 | 0.81 | | 0.729 | 0.27 | 0.27 |
| AVERAGE TEMPERATURE | 4.4 | | | | | | 4.0 | | | | | | |
| AVERAGE CONTROL RATE | | | | 0.667 | 0.333 | 0.32 | | | | | 0.683 | 0.32 | 0.30 |

F I G. 3

| HOURS | MARCH | | | | | | APRIL | | | | |
|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 7.6 | 14.4 | 0.61 | 0.547 | 0.453 | 0.40 | 12.0 | 0.35 | 0.332 | 0.668 | 0.40 |
| 10:00 | 9.1 | 12.9 | 0.54 | 0.490 | 0.510 | 0.40 | 13.0 | 0.38 | 0.359 | 0.641 | 0.40 |
| 11:00 | 11 | 11 | 0.46 | 0.418 | 0.582 | 0.40 | 13.8 | 0.40 | 0.381 | 0.619 | 0.40 |
| 12:00 | 11.4 | 10.6 | 0.45 | 0.403 | 0.597 | 0.40 | 14.4 | 0.42 | 0.398 | 0.602 | 0.40 |
| 13:00 | 12.9 | 9.1 | 0.38 | 0.346 | 0.654 | 0.40 | 14.1 | 0.41 | 0.390 | 0.610 | 0.40 |
| 14:00 | 13.5 | 8.5 | 0.36 | 0.323 | 0.677 | 0.40 | 14.0 | 0.41 | 0.387 | 0.613 | 0.40 |
| 15:00 | 14.2 | 7.8 | 0.33 | 0.296 | 0.704 | 0.40 | 12.3 | 0.36 | 0.340 | 0.660 | 0.40 |
| 16:00 | 14.2 | 7.8 | 0.33 | 0.296 | 0.704 | 0.40 | 12.8 | 0.37 | 0.354 | 0.646 | 0.40 |
| 17:00 | 13.3 | 8.7 | 0.37 | 0.330 | 0.670 | 0.40 | 13.0 | 0.38 | 0.359 | 0.641 | 0.40 |
| 18:00 | 12.3 | 9.7 | 0.41 | 0.368 | 0.632 | 0.40 | 11.9 | 0.34 | 0.329 | 0.671 | 0.40 |
| 19:00 | 11.5 | 10.5 | 0.44 | 0.399 | 0.601 | 0.40 | 11.7 | 0.34 | 0.323 | 0.677 | 0.40 |
| 20:00 | 11.2 | 10.8 | 0.46 | 0.410 | 0.590 | 0.40 | 12.4 | 0.36 | 0.343 | 0.657 | 0.40 |
| 21:00 | 10.1 | 11.9 | 0.50 | 0.452 | 0.548 | 0.40 | 12.0 | 0.35 | 0.332 | 0.668 | 0.40 |
| 22:00 | 10.3 | 11.7 | 0.49 | 0.444 | 0.556 | 0.40 | 11.4 | 0.33 | 0.315 | 0.685 | 0.40 |
| 23:00 | 10.4 | 11.6 | 0.49 | 0.441 | 0.559 | 0.40 | 11.3 | 0.33 | 0.312 | 0.688 | 0.40 |
| 0:00 | 10.1 | 11.9 | 0.50 | 0.452 | 0.548 | 0.40 | 11.0 | 0.32 | 0.304 | 0.696 | 0.40 |
| 1:00 | 6.4 | 15.6 | 0.66 | 0.592 | 0.408 | 0.40 | 15.4 | 0.45 | 0.426 | 0.574 | 0.40 |
| 2:00 | 6.2 | 15.8 | 0.67 | 0.600 | 0.400 | 0.40 | 14.6 | 0.42 | 0.403 | 0.597 | 0.40 |
| 3:00 | 6.1 | 15.9 | 0.67 | 0.604 | 0.396 | 0.40 | 14.1 | 0.41 | 0.390 | 0.610 | 0.40 |
| 4:00 | 5.4 | 16.6 | 0.70 | 0.630 | 0.370 | 0.37 | 13.6 | 0.39 | 0.376 | 0.624 | 0.40 |
| 5:00 | 5.3 | 16.7 | 0.70 | 0.634 | 0.366 | 0.37 | 13.2 | 0.38 | 0.365 | 0.635 | 0.40 |
| 6:00 | 4.4 | 17.6 | 0.74 | 0.668 | 0.332 | 0.33 | 12.5 | 0.36 | 0.345 | 0.655 | 0.40 |
| 7:00 | 5.1 | 16.9 | 0.71 | 0.642 | 0.358 | 0.36 | 12.4 | 0.36 | 0.343 | 0.657 | 0.40 |
| 8:00 | 6.3 | 15.7 | 0.66 | 0.596 | 0.404 | 0.40 | 12.0 | 0.35 | 0.332 | 0.668 | 0.40 |
| AVERAGE TEMPERATURE | 9.5 | | | | | | 12.9 | | | | |
| AVERAGE CONTROL RATE | | | | 0.474 | 0.526 | 0.39 | | | 0.356 | 0.644 | 0.40 |

FIG. 4

| HOURS | MAY | | | | | JUNE | | | | |
|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 15.7 | 0.46 | 0.434 | 0.566 | 0.40 | 24.0 | 0.70 | 0.663 | 0.337 | 0.34 |
| 10:00 | 16.6 | 0.48 | 0.459 | 0.541 | 0.40 | 26.0 | 0.75 | 0.718 | 0.282 | 0.28 |
| 11:00 | 19.6 | 0.57 | 0.542 | 0.458 | 0.40 | 26.5 | 0.77 | 0.732 | 0.268 | 0.27 |
| 12:00 | 20.1 | 0.58 | 0.555 | 0.445 | 0.40 | 28.1 | 0.81 | 0.776 | 0.224 | 0.22 |
| 13:00 | 21.3 | 0.62 | 0.589 | 0.411 | 0.40 | 28.6 | 0.83 | 0.790 | 0.210 | 0.21 |
| 14:00 | 22.1 | 0.64 | 0.611 | 0.389 | 0.39 | 27.9 | 0.81 | 0.771 | 0.229 | 0.23 |
| 15:00 | 22.0 | 0.64 | 0.608 | 0.392 | 0.39 | 27.1 | 0.79 | 0.749 | 0.251 | 0.25 |
| 16:00 | 22.8 | 0.66 | 0.630 | 0.370 | 0.37 | 26.3 | 0.76 | 0.727 | 0.273 | 0.27 |
| 17:00 | 18.5 | 0.54 | 0.511 | 0.489 | 0.40 | 25.6 | 0.74 | 0.707 | 0.293 | 0.29 |
| 18:00 | 17.5 | 0.51 | 0.484 | 0.516 | 0.40 | 24.2 | 0.70 | 0.669 | 0.331 | 0.33 |
| 19:00 | 16.9 | 0.49 | 0.467 | 0.533 | 0.40 | 22.7 | 0.66 | 0.627 | 0.373 | 0.37 |
| 20:00 | 16.6 | 0.48 | 0.459 | 0.541 | 0.40 | 21.7 | 0.63 | 0.600 | 0.400 | 0.40 |
| 21:00 | 16.0 | 0.46 | 0.442 | 0.558 | 0.40 | 21.3 | 0.62 | 0.589 | 0.411 | 0.40 |
| 22:00 | 15.2 | 0.44 | 0.420 | 0.580 | 0.40 | 20.7 | 0.60 | 0.572 | 0.428 | 0.40 |
| 23:00 | 15.4 | 0.45 | 0.426 | 0.574 | 0.40 | 20.4 | 0.59 | 0.564 | 0.436 | 0.40 |
| 0:00 | 13.4 | 0.39 | 0.370 | 0.630 | 0.40 | 20.4 | 0.59 | 0.564 | 0.436 | 0.40 |
| 1:00 | 19.9 | 0.58 | 0.550 | 0.450 | 0.40 | 19.2 | 0.56 | 0.531 | 0.469 | 0.40 |
| 2:00 | 20.1 | 0.58 | 0.555 | 0.445 | 0.40 | 18.2 | 0.53 | 0.503 | 0.497 | 0.40 |
| 3:00 | 20.7 | 0.60 | 0.572 | 0.428 | 0.40 | 17.8 | 0.52 | 0.492 | 0.508 | 0.40 |
| 4:00 | 19.9 | 0.58 | 0.550 | 0.450 | 0.40 | 17.7 | 0.51 | 0.489 | 0.511 | 0.40 |
| 5:00 | 20.0 | 0.58 | 0.553 | 0.447 | 0.40 | 18.3 | 0.53 | 0.506 | 0.494 | 0.40 |
| 6:00 | 18.3 | 0.53 | 0.506 | 0.494 | 0.40 | 19.1 | 0.55 | 0.528 | 0.472 | 0.40 |
| 7:00 | 19.0 | 0.55 | 0.525 | 0.475 | 0.40 | 20.7 | 0.60 | 0.572 | 0.428 | 0.40 |
| 8:00 | 17.9 | 0.52 | 0.495 | 0.505 | 0.40 | 22.0 | 0.64 | 0.608 | 0.392 | 0.39 |
| AVERAGE TEMPERATURE | 18.6 | | | | | 22.7 | | | | |
| AVERAGE CONTROL RATE | | | 0.513 | 0.487 | 0.40 | | | 0.627 | 0.373 | 0.34 |

F I G. 5

| HOURS | JULY ||||| AUGUST |||||
|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | QUANTITY OF ELECTRIC POWER CONSUMPTION (KWH) | AVERAGE OPERATING RATE | AVERAGE SURPLUS RATE | CONTROL RATE |
| 9:00 | 24.5 | 0.71 | 0.677 | 0.323 | 0.32 | 28.3 | 0.82 | | 0.782 | 0.218 | 0.22 |
| 10:00 | 25.3 | 0.73 | 0.699 | 0.301 | 0.30 | 29.8 | 0.86 | | 0.823 | 0.177 | 0.18 |
| 11:00 | 25.2 | 0.73 | 0.696 | 0.304 | 0.30 | 31.8 | 0.92 | | 0.879 | 0.121 | 0.12 |
| 12:00 | 25.2 | 0.73 | 0.696 | 0.304 | 0.30 | 33.1 | 0.96 | | 0.915 | 0.085 | 0.09 |
| 13:00 | 25.4 | 0.74 | 0.702 | 0.298 | 0.30 | 33.1 | 0.96 | | 0.915 | 0.085 | 0.09 |
| 14:00 | 25.2 | 0.73 | 0.696 | 0.304 | 0.30 | 34.5 | 1.00 | 14.3 | 0.953 | 0.047 | 0.05 |
| 15:00 | 24.8 | 0.72 | 0.685 | 0.315 | 0.31 | 33.3 | 0.97 | | 0.920 | 0.080 | 0.08 |
| 16:00 | 24.6 | 0.71 | 0.680 | 0.320 | 0.32 | 31.2 | 0.90 | | 0.862 | 0.138 | 0.14 |
| 17:00 | 24.6 | 0.71 | 0.680 | 0.320 | 0.32 | 29.8 | 0.86 | | 0.823 | 0.177 | 0.18 |
| 18:00 | 24.2 | 0.70 | 0.669 | 0.331 | 0.33 | 28.5 | 0.83 | | 0.788 | 0.212 | 0.21 |
| 19:00 | 24.0 | 0.70 | 0.663 | 0.337 | 0.34 | 27.7 | 0.80 | | 0.765 | 0.235 | 0.23 |
| 20:00 | 23.2 | 0.67 | 0.641 | 0.359 | 0.36 | 27.0 | 0.78 | | 0.746 | 0.254 | 0.25 |
| 21:00 | 23.0 | 0.67 | 0.636 | 0.364 | 0.36 | 26.8 | 0.78 | | 0.741 | 0.259 | 0.26 |
| 22:00 | 23.2 | 0.67 | 0.641 | 0.359 | 0.36 | 26.5 | 0.77 | | 0.732 | 0.268 | 0.27 |
| 23:00 | 22.8 | 0.66 | 0.630 | 0.370 | 0.37 | 26.5 | 0.77 | | 0.732 | 0.268 | 0.27 |
| 0:00 | 22.6 | 0.66 | 0.625 | 0.375 | 0.38 | 26.6 | 0.77 | | 0.735 | 0.265 | 0.26 |
| 1:00 | 22.9 | 0.66 | 0.633 | 0.367 | 0.37 | 25.7 | 0.74 | | 0.710 | 0.290 | 0.29 |
| 2:00 | 23.0 | 0.67 | 0.636 | 0.364 | 0.36 | 24.9 | 0.72 | | 0.688 | 0.312 | 0.31 |
| 3:00 | 22.4 | 0.65 | 0.619 | 0.381 | 0.38 | 24.9 | 0.72 | | 0.688 | 0.312 | 0.31 |
| 4:00 | 22.4 | 0.65 | 0.619 | 0.381 | 0.38 | 24.2 | 0.70 | | 0.669 | 0.331 | 0.33 |
| 5:00 | 22.5 | 0.65 | 0.622 | 0.378 | 0.38 | 24.6 | 0.71 | | 0.680 | 0.320 | 0.32 |
| 6:00 | 22.6 | 0.66 | 0.625 | 0.375 | 0.38 | 24.8 | 0.72 | | 0.685 | 0.315 | 0.31 |
| 7:00 | 23.5 | 0.68 | 0.649 | 0.351 | 0.35 | 26.0 | 0.75 | | 0.718 | 0.282 | 0.28 |
| 8:00 | 24.0 | 0.70 | 0.663 | 0.337 | 0.34 | 27.2 | 0.79 | | 0.752 | 0.248 | 0.25 |
| AVERAGE TEMPERATURE | 23.8 | | | | | 28.2 | | | | | |
| AVERAGE CONTROL RATE | | | 0.658 | 0.342 | 0.34 | | | | 0.779 | 0.221 | 0.22 |

FIG. 6

| HOURS | SEPTEMBER | | | | | OCTOBER | | | | |
|---|---|---|---|---|---|---|---|---|---|---|
| | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | OUTSIDE AIR TEMPERATURE COEFFICIENT | AVERAGE OPERATING RATE | AVERAGE SURPLUS RATE | CONTROL RATE |
| 9:00 | 24.8 | 0.72 | 0.685 | 0.315 | 0.31 | 17.9 | 0.52 | 0.495 | 0.505 | 0.40 |
| 10:00 | 24.7 | 0.72 | 0.683 | 0.317 | 0.32 | 18.1 | 0.52 | 0.500 | 0.500 | 0.40 |
| 11:00 | 25.0 | 0.72 | 0.691 | 0.309 | 0.31 | 18.5 | 0.54 | 0.511 | 0.489 | 0.40 |
| 12:00 | 26.1 | 0.76 | 0.721 | 0.279 | 0.28 | 18.5 | 0.54 | 0.511 | 0.489 | 0.40 |
| 13:00 | 27.0 | 0.78 | 0.746 | 0.254 | 0.25 | 18.7 | 0.54 | 0.517 | 0.483 | 0.40 |
| 14:00 | 26.8 | 0.78 | 0.741 | 0.259 | 0.26 | 20 | 0.58 | 0.553 | 0.447 | 0.40 |
| 15:00 | 27.7 | 0.80 | 0.765 | 0.235 | 0.23 | 20.2 | 0.59 | 0.558 | 0.442 | 0.40 |
| 16:00 | 27.6 | 0.80 | 0.763 | 0.237 | 0.24 | 19.5 | 0.57 | 0.539 | 0.461 | 0.40 |
| 17:00 | 27.0 | 0.78 | 0.746 | 0.254 | 0.25 | 19.7 | 0.57 | 0.544 | 0.456 | 0.40 |
| 18:00 | 25.9 | 0.75 | 0.716 | 0.284 | 0.28 | 19.5 | 0.57 | 0.539 | 0.461 | 0.40 |
| 19:00 | 25.1 | 0.73 | 0.694 | 0.306 | 0.31 | 18.9 | 0.55 | 0.522 | 0.478 | 0.40 |
| 20:00 | 24.1 | 0.70 | 0.666 | 0.334 | 0.33 | 17.8 | 0.52 | 0.492 | 0.508 | 0.40 |
| 21:00 | 24.0 | 0.70 | 0.663 | 0.337 | 0.34 | 18 | 0.52 | 0.497 | 0.503 | 0.40 |
| 22:00 | 24.1 | 0.70 | 0.666 | 0.334 | 0.33 | 18.2 | 0.53 | 0.503 | 0.497 | 0.40 |
| 23:00 | 23.6 | 0.68 | 0.652 | 0.348 | 0.35 | 17.3 | 0.50 | 0.478 | 0.522 | 0.40 |
| 0:00 | 23.6 | 0.68 | 0.652 | 0.348 | 0.35 | 18.8 | 0.54 | 0.519 | 0.481 | 0.40 |
| 1:00 | 22.3 | 0.65 | 0.616 | 0.384 | 0.38 | 15.5 | 0.45 | 0.428 | 0.572 | 0.40 |
| 2:00 | 22.2 | 0.64 | 0.613 | 0.387 | 0.39 | 15.9 | 0.46 | 0.439 | 0.561 | 0.40 |
| 3:00 | 21.9 | 0.63 | 0.605 | 0.395 | 0.39 | 16 | 0.46 | 0.442 | 0.558 | 0.40 |
| 4:00 | 22.0 | 0.64 | 0.608 | 0.392 | 0.39 | 16.3 | 0.47 | 0.450 | 0.550 | 0.40 |
| 5:00 | 21.9 | 0.63 | 0.605 | 0.395 | 0.39 | 15.4 | 0.45 | 0.426 | 0.574 | 0.40 |
| 6:00 | 21.8 | 0.63 | 0.602 | 0.398 | 0.40 | 16.4 | 0.48 | 0.453 | 0.547 | 0.40 |
| 7:00 | 22.2 | 0.64 | 0.613 | 0.387 | 0.39 | 17.2 | 0.50 | 0.475 | 0.525 | 0.40 |
| 8:00 | 22.9 | 0.66 | 0.633 | 0.367 | 0.37 | 18.1 | 0.52 | 0.500 | 0.500 | 0.40 |
| AVERAGE TEMPERATURE | 24.3 | | | | | 17.9 | | | | |
| AVERAGE CONTROL RATE | | | 0.673 | 0.327 | 0.33 | | | 0.496 | 0.504 | 0.40 |

F I G. 7

| HOURS | NOVEMBER ||||||| DECEMBER |||||||
|---|---|---|---|---|---|---|---|---|---|---|---|---|---|---|
| | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE | CURRENT OUTSIDE AIR TEMPERATURE | TEMPERATURE DIFFERENCE FROM ROOM TEMPERATURE | OUTSIDE AIR TEMPERATURE COEFFICIENT | AVERAGE OPERATING RATE | AVERAGE SURPLUS RATE | CONTROL RATE |
| 9:00 | 11.6 | 10.4 | 0.30 | 0.287 | 0.713 | 0.40 | 6.7 | 15.30 | 0.65 | 0.581 | 0.419 | 0.40 |
| 10:00 | 12.5 | 9.5 | 0.28 | 0.263 | 0.737 | 0.40 | 10.3 | 11.70 | 0.49 | 0.444 | 0.556 | 0.40 |
| 11:00 | 12.6 | 9.4 | 0.27 | 0.260 | 0.740 | 0.40 | 11.9 | 10.10 | 0.43 | 0.384 | 0.616 | 0.40 |
| 12:00 | 12.6 | 9.4 | 0.27 | 0.260 | 0.740 | 0.40 | 12.5 | 9.50 | 0.40 | 0.361 | 0.639 | 0.40 |
| 13:00 | 12.6 | 9.4 | 0.27 | 0.260 | 0.740 | 0.40 | 13.8 | 8.20 | 0.35 | 0.311 | 0.689 | 0.40 |
| 14:00 | 12.7 | 9.3 | 0.27 | 0.257 | 0.743 | 0.40 | 14.3 | 7.70 | 0.32 | 0.292 | 0.708 | 0.40 |
| 15:00 | 12.6 | 9.4 | 0.27 | 0.260 | 0.740 | 0.40 | 13.4 | 8.60 | 0.36 | 0.327 | 0.673 | 0.40 |
| 16:00 | 12.1 | 9.9 | 0.29 | 0.274 | 0.726 | 0.40 | 11.6 | 10.40 | 0.44 | 0.395 | 0.605 | 0.40 |
| 17:00 | 11.4 | 10.6 | 0.31 | 0.293 | 0.707 | 0.40 | 10.2 | 11.80 | 0.50 | 0.448 | 0.552 | 0.40 |
| 18:00 | 10.8 | 11.2 | 0.32 | 0.309 | 0.691 | 0.40 | 9.2 | 12.80 | 0.54 | 0.486 | 0.514 | 0.40 |
| 19:00 | 10.7 | 11.3 | 0.33 | 0.312 | 0.688 | 0.40 | 8.4 | 13.60 | 0.57 | 0.516 | 0.484 | 0.40 |
| 20:00 | 10.9 | 11.1 | 0.32 | 0.307 | 0.693 | 0.40 | 7.6 | 14.40 | 0.61 | 0.547 | 0.453 | 0.40 |
| 21:00 | 10.9 | 11.1 | 0.32 | 0.307 | 0.693 | 0.40 | 6.6 | 15.40 | 0.65 | 0.585 | 0.415 | 0.40 |
| 22:00 | 11.0 | 11.0 | 0.32 | 0.304 | 0.696 | 0.40 | 6.5 | 15.50 | 0.65 | 0.589 | 0.411 | 0.40 |
| 23:00 | 11.0 | 11.0 | 0.32 | 0.304 | 0.696 | 0.40 | 6.1 | 15.90 | 0.67 | 0.604 | 0.396 | 0.40 |
| 0:00 | 10.8 | 11.2 | 0.32 | 0.309 | 0.691 | 0.40 | 5.8 | 16.20 | 0.68 | 0.615 | 0.385 | 0.38 |
| 1:00 | 9.9 | 12.1 | 0.35 | 0.334 | 0.666 | 0.40 | 2.5 | 19.50 | 0.82 | 0.741 | 0.259 | 0.26 |
| 2:00 | 9.2 | 12.8 | 0.37 | 0.354 | 0.646 | 0.40 | 3 | 19.00 | 0.80 | 0.722 | 0.278 | 0.28 |
| 3:00 | 8.6 | 13.4 | 0.39 | 0.370 | 0.630 | 0.40 | 1.9 | 20.10 | 0.85 | 0.763 | 0.237 | 0.24 |
| 4:00 | 9.1 | 12.9 | 0.37 | 0.356 | 0.644 | 0.40 | 1.5 | 20.50 | 0.86 | 0.778 | 0.222 | 0.22 |
| 5:00 | 8.1 | 13.9 | 0.40 | 0.384 | 0.616 | 0.40 | 1.2 | 20.80 | 0.88 | 0.790 | 0.210 | 0.21 |
| 6:00 | 8.3 | 13.7 | 0.40 | 0.379 | 0.621 | 0.40 | 0.4 | 21.60 | 0.91 | 0.820 | 0.180 | 0.18 |
| 7:00 | 11.9 | 10.1 | 0.29 | 0.279 | 0.721 | 0.40 | 1.3 | 20.70 | 0.87 | 0.786 | 0.214 | 0.21 |
| 8:00 | 11.7 | 10.3 | 0.30 | 0.285 | 0.715 | 0.4 | 3.1 | 18.90 | 0.80 | 0.718 | 0.282 | 0.28 |
| AVERAGE TEMPERATURE | 11.0 | | | | | | 7.1 | | | | | |
| AVERAGE CONTROL RATE | | | | 0.304 | 0.696 | 0.40 | | | | 0.567 | 0.433 | 0.34 |

AIR-CONDITIONING CONTROL SYSTEM AND PROGRAM

TECHNICAL FIELD

The present invention relates to an air-conditioning control system and a program for the same controlling an air conditioner. In particular, the present invention relates to an air-conditioning control system and a program for the same for achieving appropriate energy saving with simplified calculations.

BACKGROUND ART

The inventor has proposed an energy management system in which it is judged that a current specific enthalpy value (air total heat) calculated from an outside air temperature and an outside air humidity corresponds to a specific enthalpy value denoted by yearly weather transition data in what month, to determine an optimum control pattern, thereby controlling an air conditioner (for example, refer to the Paragraph 0036 in Patent Literature 1).

CITATION LIST

Patent Literature

[Patent Literature 1] International Publication No. WO 2006/085406

SUMMARY OF INVENTION

Technical Problem

However, in the above-described energy management system, the hourly control in a day is performed by calculating hourly load of a building, and by calculating its surplus rate for example in August. Therefore, it is necessary to perform elaborate calculations when calculating the load, and there are many parameters to be considered as well, which have made reasonable and appropriate energy-saving control difficult.

The present invention has been achieved in consideration of the above-described problem, and an object of the present invention is to provide an air-conditioning control system and a program for the same for achieving appropriate energy saving with simplified calculations.

Solution to Problem

An air-conditioning control system of the present invention comprises outside air temperature input means for inputting outside air temperature information; outside air temperature coefficient calculation means for calculating, based on an outside air temperature calculated from the outside air temperature information input by the outside air temperature input means, a ratio of a current outside air temperature to an outside air temperature at a maximum temperature during air-cooling, and a ratio of a temperature difference between a current outside air temperature and a predetermined room temperature to a temperature difference between an outside air temperature at a minimum temperature and the room temperature during air-heating, as an outside air temperature coefficient; peak operating rate calculation means for calculating an average operating rate of an air conditioner at the maximum temperature during air-cooling, and the average operating rate of the air conditioner at the minimum temperature during air-heating, as a peak operating rate; average operating rate calculation means for calculating the hourly average operating rate by multiplying the peak operating rate calculated by the peak operating rate calculation means by the outside air temperature coefficient calculated by the outside air temperature coefficient calculation means; average surplus rate calculation means for calculating (1−average operating rate) as an average surplus rate where the average operating rate is calculated by the average operating rate calculation means; control rate calculation means for calculating a control rate whose maximum value is a predetermined value in the average surplus rate calculated by the average surplus rate calculation means; and air-conditioning control means for performing energy-saving control of the air conditioner by a quantity of the control rate calculated by the control rate calculation means.

Further, the peak operating rate calculation means calculates the average operating rate by dividing an actual quantity of electric power used of the air conditioner by a rated quantity of electric power used, thereby it is possible to simply calculate a appropriate average operating rate.

Further, the predetermined value of the control rate calculation means is from 0.30 to 0.50, and the operating rate of the air conditioner is not remarkably lowered, which makes it possible to protect the equipment.

Further, the present invention is a program which makes a computer operate as the aforementioned system.

Advantageous Effects of Invention

According to the present invention, it is possible to provide an air-conditioning control system and a program for the same for achieving appropriate energy saving with simplified calculations.

BRIEF DESCRIPTION OF DRAWINGS

FIG. 2 is a table showing an example of hourly control in January and February.

FIG. 3 is a table showing an example of hourly control in March and April.

DESCRIPTION OF EMBODIMENTS

Hereinafter, modes for carrying out the present invention will be described in detail with reference to the accompanying drawings.

EXAMPLE

Figure 1:
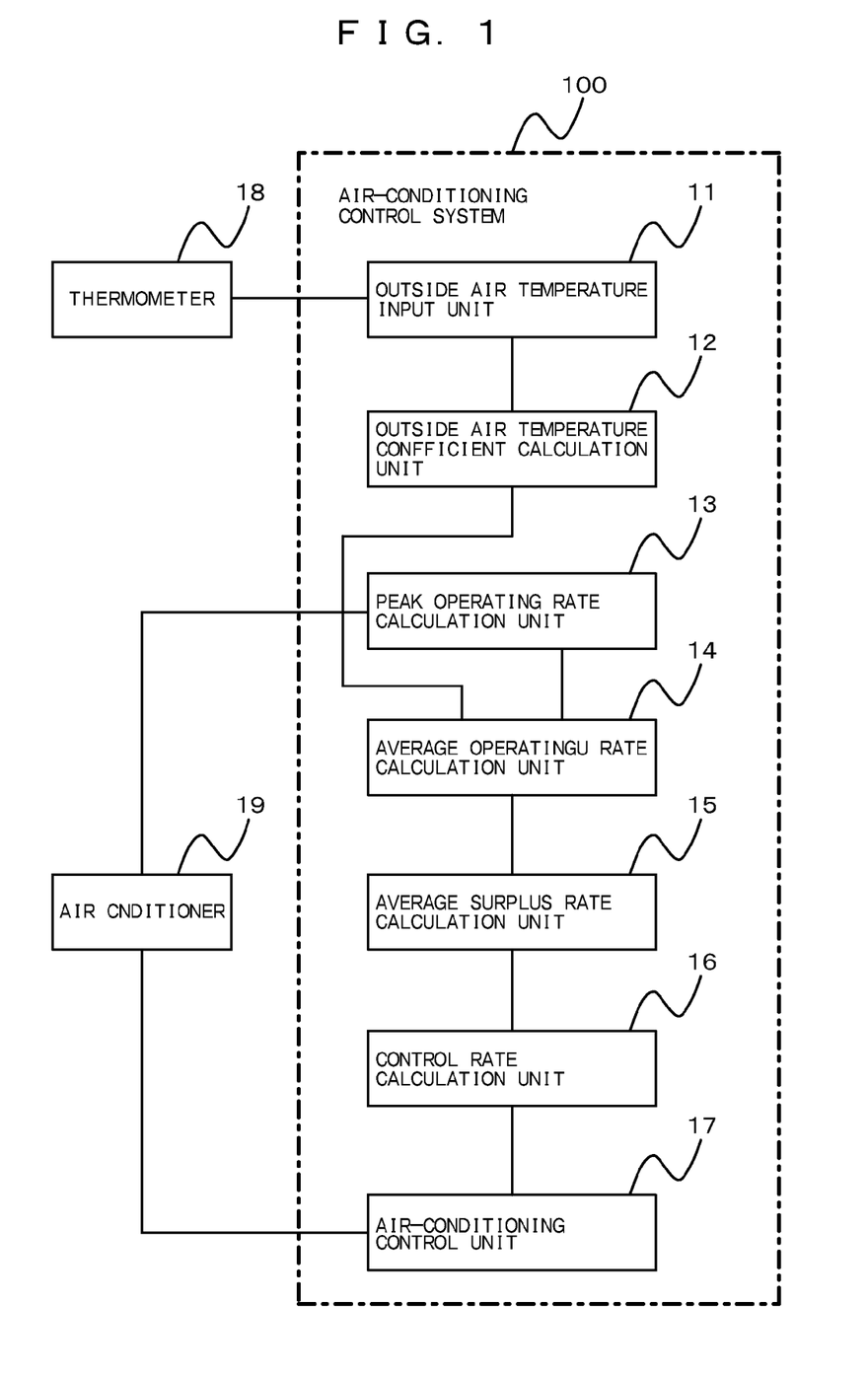
FIG. 1 is a diagram showing a configuration of an air-conditioning control system according to an embodiment of the present invention.
Figure 4:
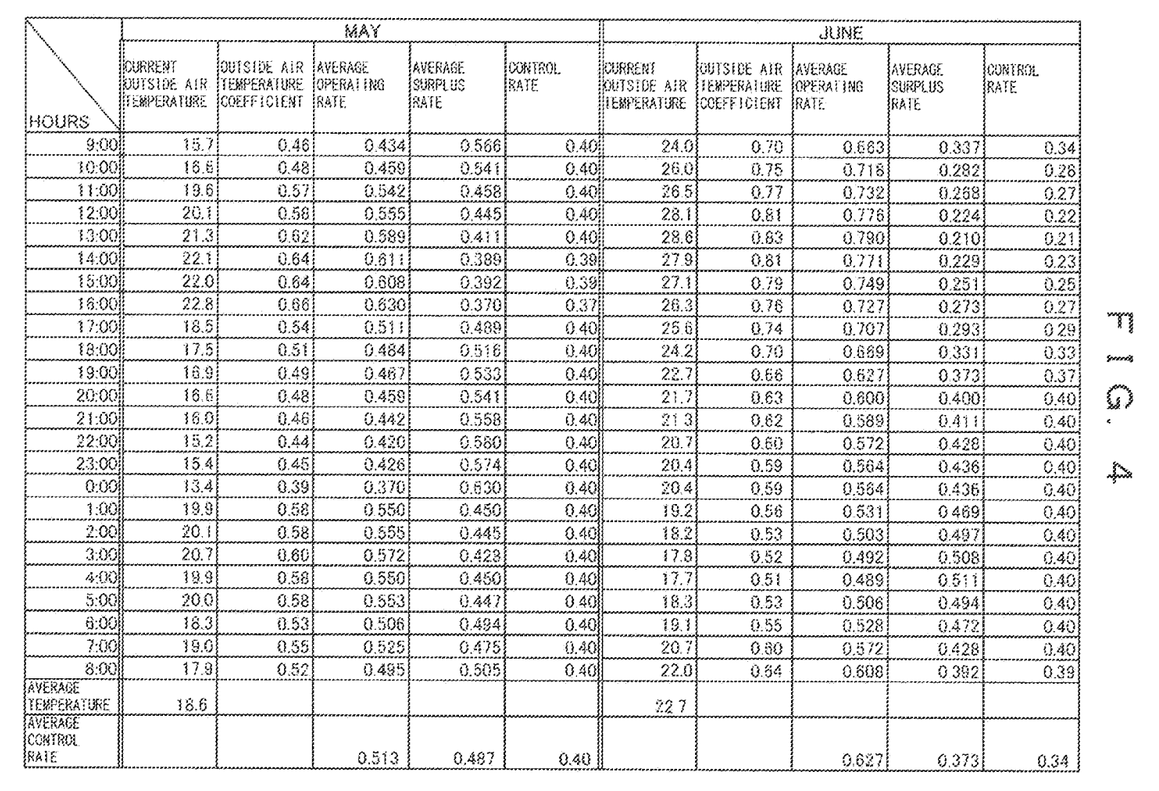
FIG. 4 is a table showing an example of hourly control in May and June.
Figure 5:
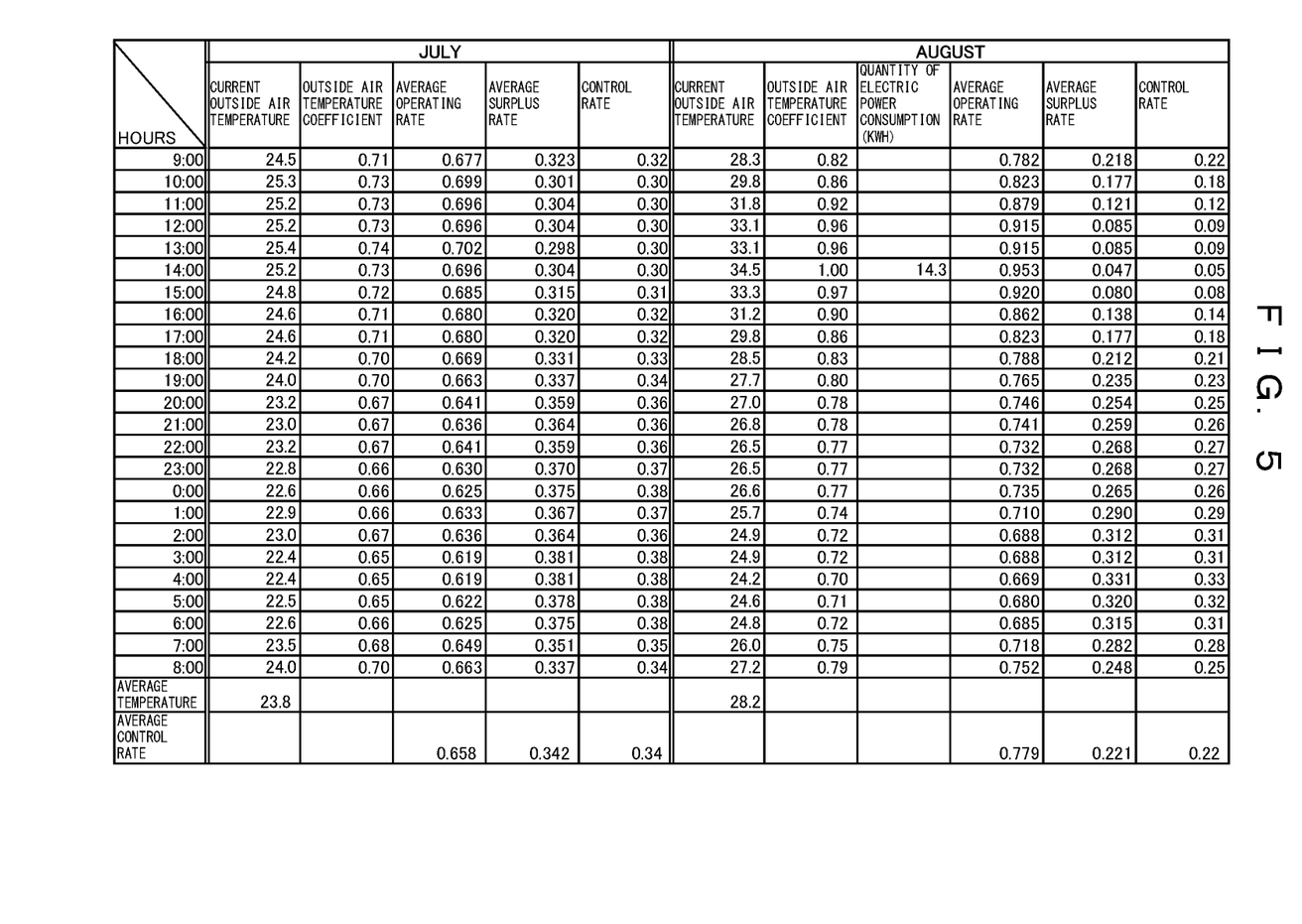
FIG. 5 is a table showing an example of hourly control in July and August.
Figure 6:
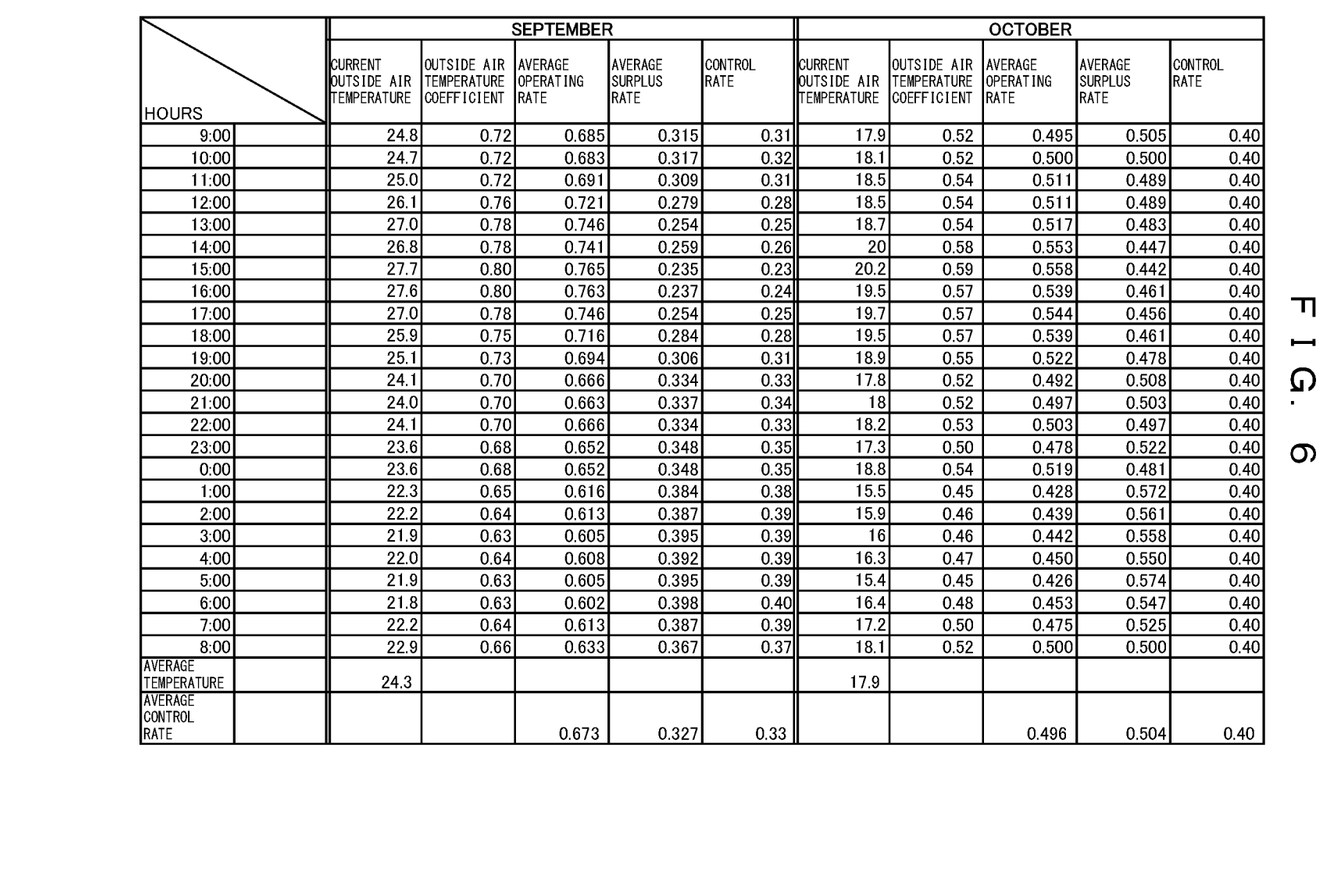
FIG. 6 is a table showing an example of hourly control in September and October.
Figure 7:
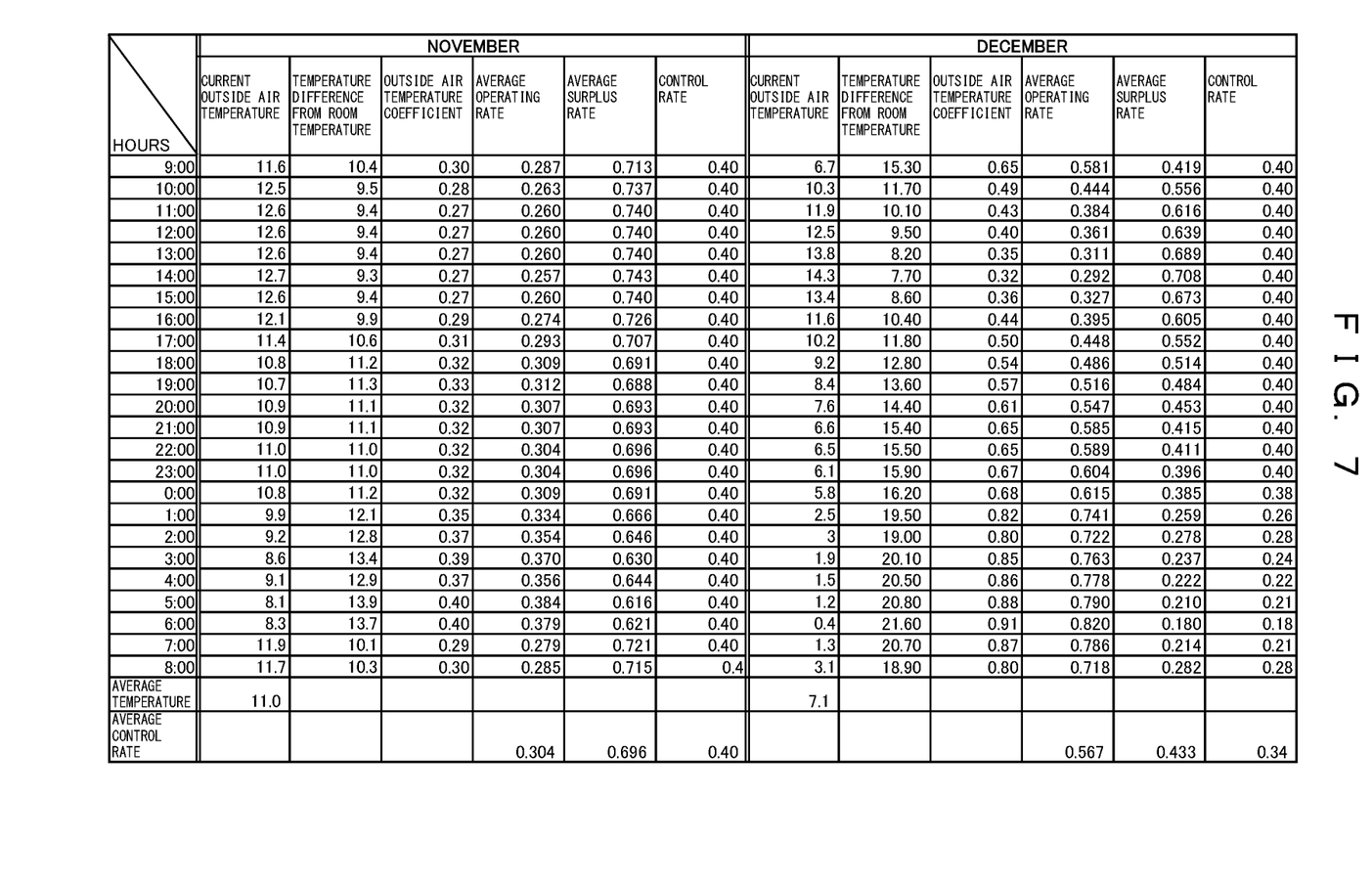
FIG. 7 is a table showing an example of hourly control in November and December.

FIG. 1 is a diagram showing a configuration of an air-conditioning control system according to an embodiment of the present invention. An air-conditioning control system 100 according to the present embodiment comprises an outside air temperature input unit 11, an outside air temperature coefficient calculation unit 12, a peak operating rate calculation unit 13, an average operating rate calculation unit 14, an average surplus rate calculation unit 15, a control rate calculation unit 16, and an air-conditioning control unit 17. A thermometer 18 and an air conditioner 19 are described for explanation of the air-conditioning control system 100 according to the present embodiment. In the present embodiment, a control rate for energy-saving control of the air conditioner 19 is calculated, to perform energy-saving control of the air conditioner 19 appropriately according to the control rate. The control may be performed such that the air conditioner 19 is stopped (turned off) in a predetermined pattern, or inverter-controlled.

First, outside air temperature information is input to the outside air temperature input unit 11 from the thermometer 18 installed outdoors. The outside air temperature coefficient calculation unit 12 calculates an outside air temperature coefficient according to formula (1).

$$\text{Outside air temperature coefficient} = T/Tcp \text{ (during air-cooling)} = (Tr-T)/(Tr-Twp) \text{ (during air-heating)} \quad (1)$$

Where, T: Current outside air temperature

Tcp: Maximum outside air temperature (for example, at two p.m. in August)

Tr: Room temperature (for example 22° C., on the assumption that it is constant)

Twp: Minimum outside air temperature (for example, at six a.m. in February)

Specific examples of the outside air temperature coefficients are shown in FIGS. 2 to 7. In the present embodiment, air-cooling is performed from April to November, and air-heating is performed from December to March. The peak operating rate calculation unit 13 calculates a peak operating rate according to formula (2).

$$\text{Peak operating rate} = \text{Actual quantity of electric power used}/\text{Rated quantity of electric power used} \quad (2)$$

Where, the actual quantity of electric power used is an actual quantity of electric power used of the air conditioner 19 at the time of the maximum outside air temperature during air-cooling and at the time of the minimum outside air temperature during air-heating, and a rated quantity of electric power used is the rated quantity of electric power used of the air conditioner 19.

The average operating rate calculation unit 14 calculates an average operating rate according to formula (3).

$$\text{Average operating rate} = \text{Peak operating rate} \times \text{Outside air temperature coefficient} \quad (3)$$

The average surplus rate calculation unit 15 calculates an average surplus rate according to formula (4).

$$\text{Average surplus rate} = 1 - \text{Average operating rate} \quad (4)$$

The control rate calculation unit 16 calculates a control rate according to formula (5).

$$\text{Control rate} = \text{Average surplus rate (when average surplus rate} < 0.40) = 0.40 \text{ (when average surplus rate } 0.40) \quad (5)$$

In this way, by setting an upper limit for the control rate, the operating rate is not remarkably lowered, and therefore, it is possible to protect the equipment.

The air-conditioning control unit 17 performs energy-saving control of the air conditioner 19 by a quantity of a control rate. For example, when a control rate is 0.40, the air conditioner 19 is stopped by 40% in a predetermined pattern, or the air conditioner 19 is inverter-controlled by electric power of 60% of a rated quantity of electric power used.

FIGS. 2 to 7 are tables showing examples of control rates for one year. The examples of current outside air temperatures, temperature differences with room temperature, outside air temperature coefficients, average operating rate is, average surplus rates, and control rates hourly in the respective months are shown. The tables show that the quantities of electric power consumption at the time of the minimum outside air temperature and at the time of the maximum outside air temperature in February and August are respectively 13.5 (KWh) and 14.3 (KWh). In the present embodiment, the rated quantity of electric power used is 15 (KWh).

In this way, the present embodiment is to calculate a control rate for energy saving in consideration of an outside air temperature on the basis of an actual quantity of electric power used. Therefore, it is possible to perform appropriate energy-saving control with simplified calculations, which is practical and extremely beneficial.

In addition, the present invention is not limited to the above-described embodiment.

Because the voltage is supposed to be constant, a quantity of electric current used may replace the above-described quantity of electric power used.

Even if a predetermined value of the control rate calculation unit 16 is within a range from 0.30 to 0.50, it is possible to sufficiently achieve the object.

The air-conditioning control system of the present invention may also be realized by a program to operate a computer as the present air-conditioning control system. This program may be stored in a storage medium that can be read by a computer.

This storage medium recorded with the program may be a ROM itself of the air-conditioning control system, or may be a storage medium such as a CD-ROM that can be read, when a program reading device such as a CD-ROM drive is provided as an external storage device, by inserting therein the storage medium.

Moreover, the abovementioned storage medium may be a magnetic tape, a cassette tape, a flexible disk, a hard disk, an MO/MD/DVD or the like, or a semiconductor memory.

All the publications cited in the present specification are incorporated in the present specification by reference in their entirety.

REFERENCE SIGNS LIST 11 outside air temperature input unit
12 outside air temperature coefficient calculation unit
13 peak operating rate calculation unit
14 average operating rate calculation unit
15 average surplus rate calculation unit
16 control rate calculation unit
17 air-conditioning control unit
18 thermometer
19 air conditioner
100 air-conditioning control system

The invention claimed is:

1. An air-conditioning control system comprising:
outside air temperature input means for inputting outside air temperature information;
outside air temperature coefficient calculation means for calculating, based on an outside air temperature calculated from the outside air temperature information input by the outside air temperature input means, a ratio of a current outside air temperature to an outside air temperature at a maximum temperature during air-cooling, and a ratio of a temperature difference between a current outside air temperature and a predetermined room temperature to a temperature difference between an outside air temperature at a minimum temperature and the room temperature during air-heating, as an outside air temperature coefficient;

peak operating rate calculation means for calculating an average operating rate of an air conditioner at the maximum temperature during air-cooling, and the average operating rate of the air conditioner at the minimum temperature during air-heating, as a peak operating rate;

average operating rate calculation means for calculating the hourly average operating rate by multiplying the peak operating rate calculated by the peak operating rate calculation means by the outside air temperature coefficient calculated by the outside air temperature coefficient calculation means;

average surplus rate calculation means for calculating (1−average operating rate) as an average surplus rate where the average operating rate is calculated by the average operating rate calculation means;

control rate calculation means for calculating a control rate whose maximum value is a predetermined value in the average surplus rate calculated by the average surplus rate calculation means; and air-conditioning control means for performing energy-saving control of the air conditioner by a quantity of the control rate calculated by the control rate calculation means.

2. The air-conditioning control system according to claim 1, wherein the peak operating rate calculation means calculates the average operating rate by dividing an actual quantity of electric power used of the air conditioner by a rated quantity of electric power used.

3. The air-conditioning control system according to claim 1, wherein the predetermined value of the control rate calculation means is from 0.30 to 0.50.

4. The air-conditioning control system according to claim 2, wherein the predetermined value of the control rate calculation means is from 0.30 to 0.50.

* * * * *